(12) United States Patent
Shiraishi et al.

(10) Patent No.: US 6,647,951 B2
(45) Date of Patent: Nov. 18, 2003

(54) DIRECT-INJECTION TYPE DIESEL ENGINE

(75) Inventors: Yasunori Shiraishi, Sakai (JP); Masahiro Aketa, Sakai (JP); Wataru Iwanaga, Sakai (JP); Yuzo Umeda, Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 10/100,087

(22) Filed: Mar. 19, 2002

(65) Prior Publication Data

US 2003/0051703 A1 Mar. 20, 2003

(30) Foreign Application Priority Data

Sep. 18, 2001 (JP) ..................................... P 2001-282499

(51) Int. Cl.[7] ................................................ F02P 19/00
(52) U.S. Cl. ..................... 123/301; 123/305; 123/145 A
(58) Field of Search ................................. 123/294, 301, 123/302, 305, 145 A

(56) References Cited

U.S. PATENT DOCUMENTS

| | | | |
|---|---|---|---|
| 5,676,107 A | * 10/1997 | Yuzuriha et al. | ............. 123/302 |
| 5,927,246 A | * 7/1999 | Occella et al. | ............... 123/302 |
| 5,964,196 A | 10/1999 | Sigle et al. | |
| 6,065,437 A | 5/2000 | Kleinschmidt | |
| 6,105,553 A | * 8/2000 | Polach | ........................ 123/305 |

* cited by examiner

*Primary Examiner*—Erick Solis
(74) *Attorney, Agent, or Firm*—Bacon & Thomas, PLLC

(57) ABSTRACT

A direct-injection type diesel engine comprises a cylinder head (1) with a fuel injection nozzle (2) and a glow plug (3) attached thereto. The fuel injection nozzle (2) has a leading end opposed to a cylinder mid portion (4) and the glow plug (3) extends through an intake port wall portion (6) between the fuel injection nozzle (2) and an intake port (5). The glow plug (3) is inclined with respect to the fuel injection nozzle (2) by a predetermined angle ($\theta 1$) and has a leading end inserted into the cylinder mid portion (4).

8 Claims, 6 Drawing Sheets

DIRECT-INJECTION TYPE DIESEL ENGINE

BACKGROUND OF THE INVENTION

1. Field of the Invention

The present invention relates to a direct-injection type diesel engine and more particularly to an engine which can prevent overheat of a glow plug.

2. Description of Prior Art

There is a conventional engine which comprises a cylinder head with a fuel injection nozzle and a glow plug attached thereto like the present invention, as a direct-injection type diesel engine.

However, the conventional type of engine has a glow plug extending through an exhaust port wall portion.

According to the conventional technique, exhaust air passing through an exhaust port has its heat easily transmitted to the glow plug with the result of readily overheating the glow plug.

SUMMARY OF THE INVENTION

The present invention has an object to provide a direct-injection type diesel engine capable of solving the foregoing problem.

The contents of the present invention is as follows.

It is a direct-injection type diesel engine, as shown in FIG. 1, which comprises a cylinder head 1 with a fuel injection nozzle 2 and a glow plug 3 attached thereto.

The fuel injection nozzle 2 has a leading end opposed to a cylinder mid portion 4 and the glow plug 3 extends through an intake port wall portion 6 between the fuel injection nozzle 2 and an intake port 5. The glow plug 3 is inclined with respect to the fuel injection nozzle 2 by a predetermined angle (θ1) and has a leading end inserted into the cylinder mid portion 4.

The present invention offers the following effect.

"Effect 1" It is Possible to Inhibit the Overheat of the Glow Plug.

As shown in FIG. 1, the glow plug extends through the intake port wall portion 6 between the fuel injection nozzle 2 and the intake port 5. Therefore, exhaust air passing through an exhaust port 11 has its heat hardly transmitted to the glow plug 3. This results in the possibility of preventing the overheat of the glow plug 3.

"Effect 2" It is Possible to Uniformly Heat a Combustion Chamber Over its Entirety.

As shown in FIG. 1, the glow plug 3 has its leading end inserted into the cylinder mid portion 4 with the result of being able to uniformly heat the whole combustion chamber.

"Effect 3" It is Easy to Insert the Glow Plug.

As shown in FIG. 1, the glow plug 3 is inclined with respect to the fuel injection nozzle 2. Therefore, it is possible to insert the leading end of the glow plug 3 into the cylinder mid portion 4 without causing the glow plug 3 to interfere with the fuel injection nozzle 2. This makes it easy to insert the glow plug 3.

"Effect 4" A Swirl is Strengthened in the Combustion Chamber.

As shown in FIG. 1, in the case of forming a wedge-like port portion 5a which increase its width toward intake valve ports 10a, 10b, intake air passing through the intake port 5 is strongly pushed into the intake valve ports 10a,10b as shown in FIG. 2, while being pressed to an opposite wall 8a in the wedge-like port portion 5a. This allows high-speed intake air to flow into an inner peripheral surface side portion of a cylinder 21 to result in strengthening the swirl within the cylinder 21.

"Effect 5" It is Possible to Inhibit the Overheat of the Fuel Injection Nozzle.

As shown in FIGS. 1 and 2, the intake port wall portion 6 is projected to provide a nozzle boss 6a through which the fuel injection nozzle 2 is inserted. This arrangement makes it hard for the heat of the exhaust air passing through the exhaust port 11 to be transmitted. Thus it is possible to prevent the overheat of the fuel injection nozzle 2.

"Effect 6" The Overheat of the Glow Plug is Inhibited.

As shown in FIG. 2, the intake port wall portion 6 through which the glow plug 3 extends opposes to an inter-port transverse water passage 12. This arrangement inhibits the overheat of the glow plug 3.

"Effect 7" Intake Air is Filled With a High Efficiency.

As shown in FIG. 2, cooling water which passes through the inter-port transverse water passage 12 is arranged to flow from the intake air distributing means 13 to the exhaust air converging means 14. This arrangement makes it hard for the exhaust air heat to be transmitted to the intake air distributing means and can prohibit the intake air from increasing its temperature. Thus intake air is filled with a high efficiency.

"Effect 8" It is Possible to Inhibit Leakage of the Glow Plug.

As shown in FIG. 1, the glow plug 3 has a terminal projected out of the head cover 15. This arrangement removes a likelihood that condensed water, oil mist and the like within the head cover 15 adhere to the terminal, with the result of being able to inhibit the leakage of the glow plug 3.

"Effect 9" It is Possible to Secure a Large Volume of a Breather Chamber.

As shown in FIG. 5, when seen in a direction parallel with the cylinder center axis 7, the intake port wall portion 6 through which the glow plug 3 extends is displaced in a direction opposite to a direction in which the breather chamber 20 is deviated from a center axis 17 of a crank shaft. Owing to this arrangement, the breather chamber 20 can expand into the direction opposite to the deviated direction without being interrupted by the glow plug 3 which extends through the head cover 15. This results in the possibility of securing a large volume of the breather chamber 20.

BRIEF DESCRIPTION OF THE DRAWINGS

FIG. 5 is a view explaining a head cover of the engine shown in FIG. 1.

DESCRIPTION OF THE PREFERRED EMBODIMENTS

An embodiment of the present invention is explained based on the drawings. FIGS. 1 to 6 show the embodiment of the present invention. In this embodiment, explanation is given for a vertical overhead multi-cylinder diesel engine.

This engine is constructed as follows.

Figure 1:
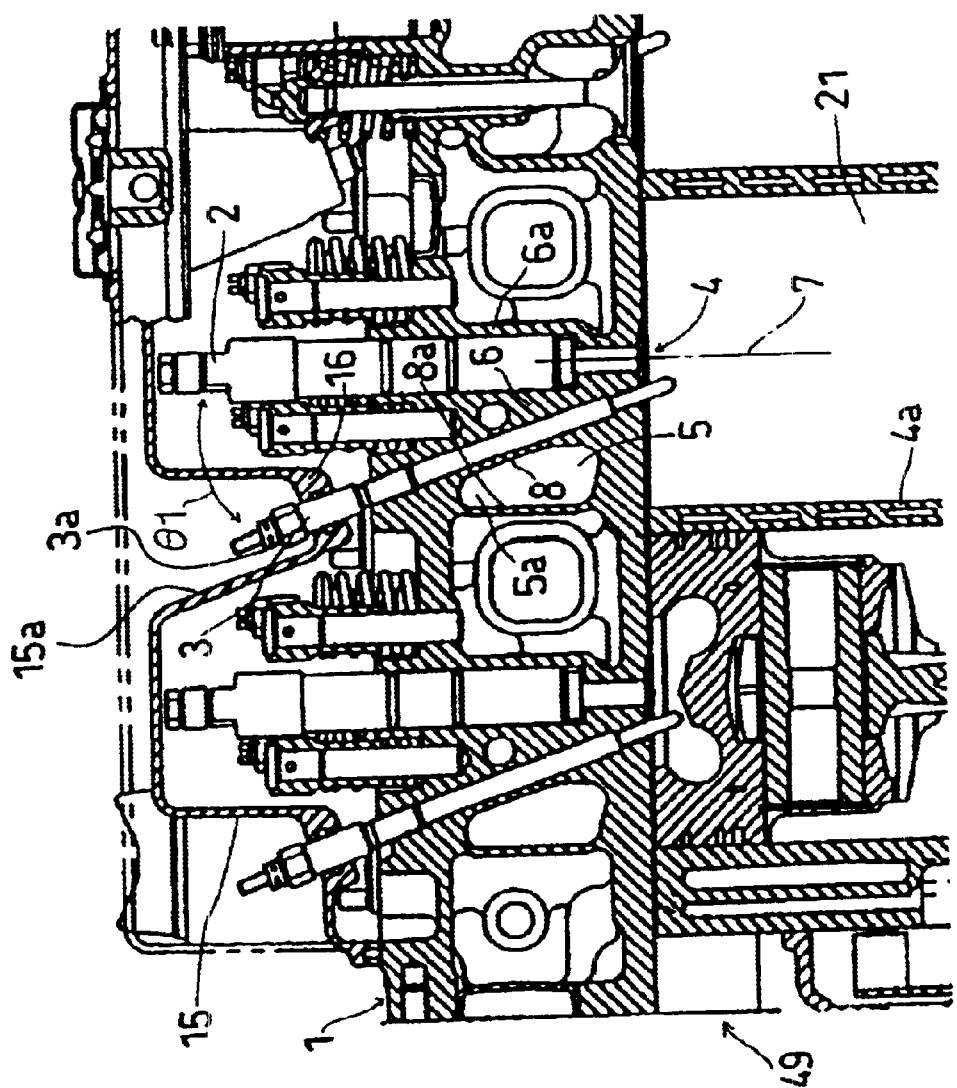
FIG. 1 is a vertical sectional side view of the neighborhood of a front end portion of a cylinder head of an engine according to an embodiment of the present invention.

As shown in FIG. 1, a cylinder block 49 has an upper portion to which a cylinder head 1 is assembled. A head cover 15 is assembled to an upper portion of the cylinder head 1. The cylinder head 1 has a fuel injection nozzle 2 and a glow plug 3 attached thereto.

The fuel injection nozzle 2 and the glow plug 3 are attached by the following structure.

As shown in FIG. 1, the fuel injection nozzle 2 has a leading end opposed to a cylinder mid portion 4. The glow plug 3 extends through an intake port wall portion 6 between the fuel injection nozzle 2 and an intake port 5. The glow plug 3 is inclined with respect to the fuel injection nozzle 2 by a predetermined angle ($\theta 1$) and has a leading end inserted into the cylinder mid portion 4.

The foregoing construction offers the following advantage.

The glow plug 3 extends through the intake port wall portion 6 between the fuel injection nozzle 2 and the intake port 5. This makes it hard for heat of exhaust air passing through an exhaust port 11 to be transmitted to the glow plug 3. Thus it is possible to prevent the overheat of the glow plug 3. Further, the glow plug 3 has the leading end inserted into the cylinder mid portion 4 to result in the possibility of uniformly heating a combustion chamber over its entirety. Besides, the glow plug 3 is inclined with respect to the fuel injection nozzle 2. This enables its leading end to be inserted into the cylinder mid portion 4 without causing the glow plug 3 to interfere with the fuel injection nozzle 2. This facilitates the insertion of the glow plug 3.

The intake port 5 is constructed as follows.

As shown in FIG. 1, a swirl intake port is employed for the intake port 5. The intake port wall portion 6 has an inner wall surface 8 near intake valve ports 10a, 10b. The inner wall surface 8 is inclined so that it approaches a cylinder center axis 7 as it comes closer to a cylinder 21. This inner wall surface 8 extends along the inclination of the glow plug 3 and has its opposite wall surface 8a made upright along a direction parallel to the cylinder center axis 7. These wall surfaces 8, 8a define therebetween a wedge-like port portion 5a increasing its width toward the intake valve ports 10a, 10b. This strongly pushes the air passing through the intake port 5 into the intake valve ports 10a, 10b while being pressed to the opposite wall 8a in the wedge-like port portion 5a. As a result, high-speed intake air flows into the vicinity of an inner peripheral surface side portion of the cylinder 21 to thereby strengthen the swirl within the cylinder 21.

The fuel injection nozzle 2 is attached by the following structure.

Figure 2:
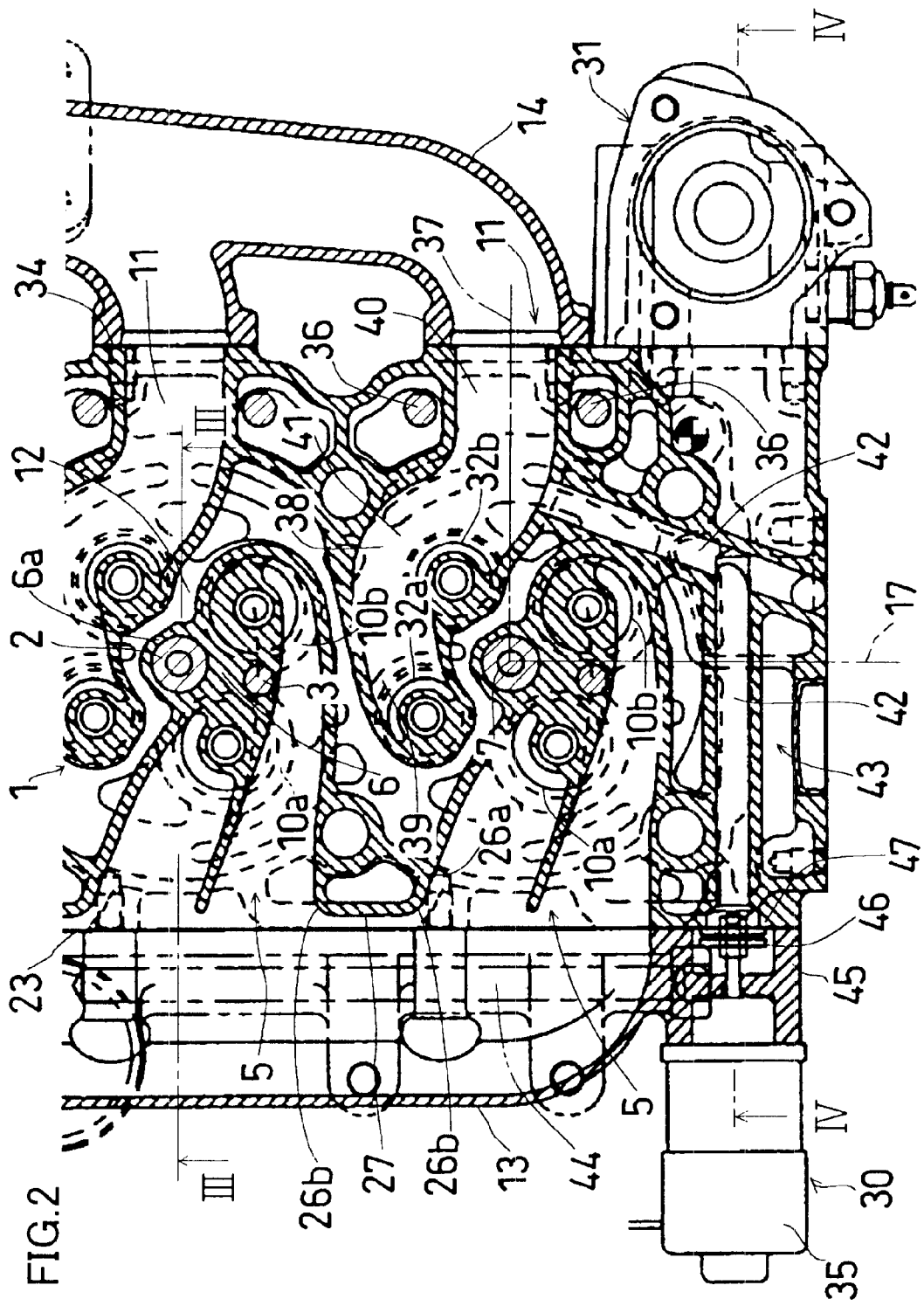
FIG. 2 is a cross sectional plan view of the front end portion of the cylinder head of the engine shown in FIG. 1.
Figures 3A, 3B:
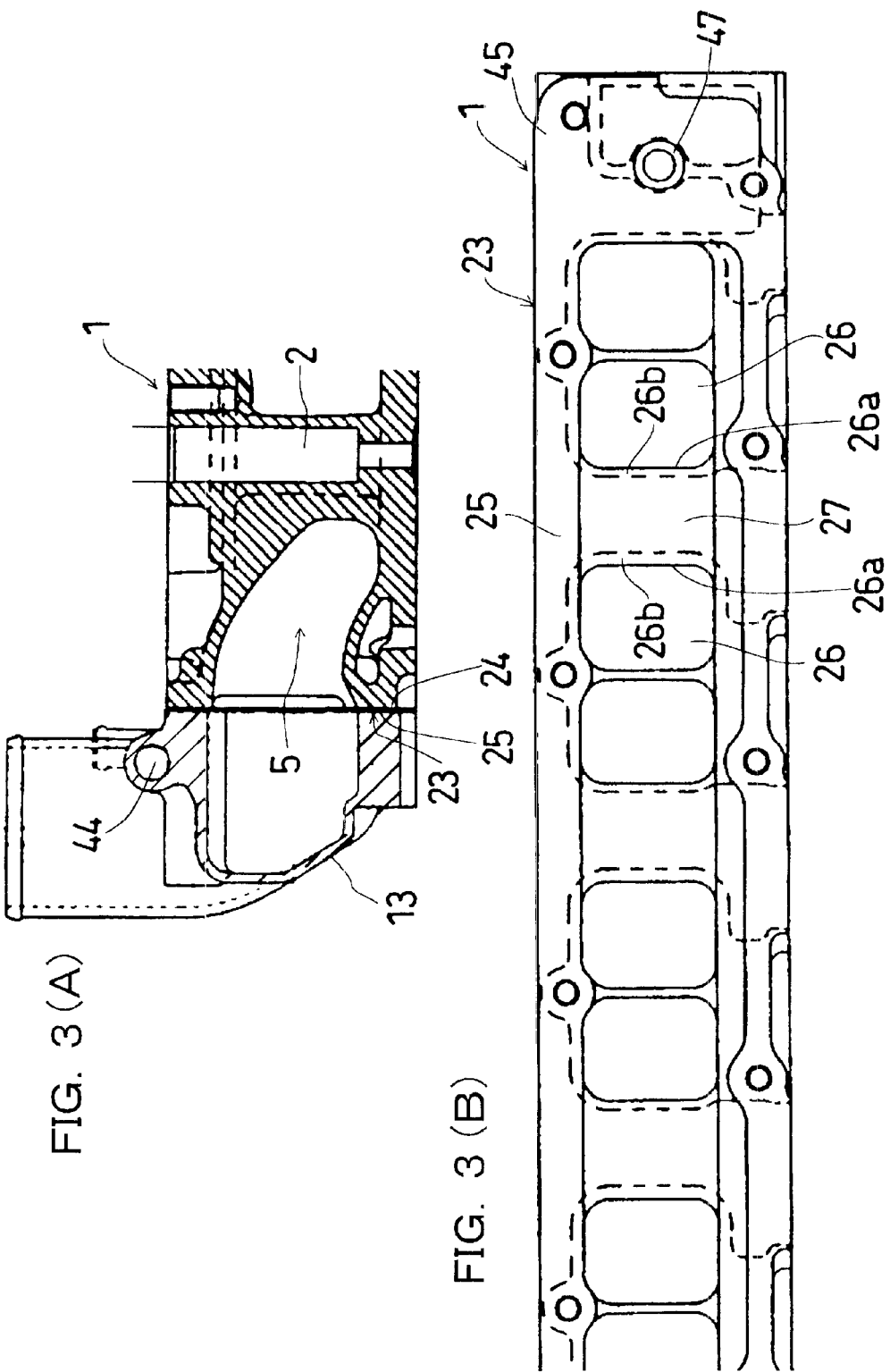
FIG. 3(A) is a sectional view of FIG. 2 taken along a line III—III.
FIG. 3(B) is a side view of the cylinder head of the engine shown in FIG. 1.
Figure 4:
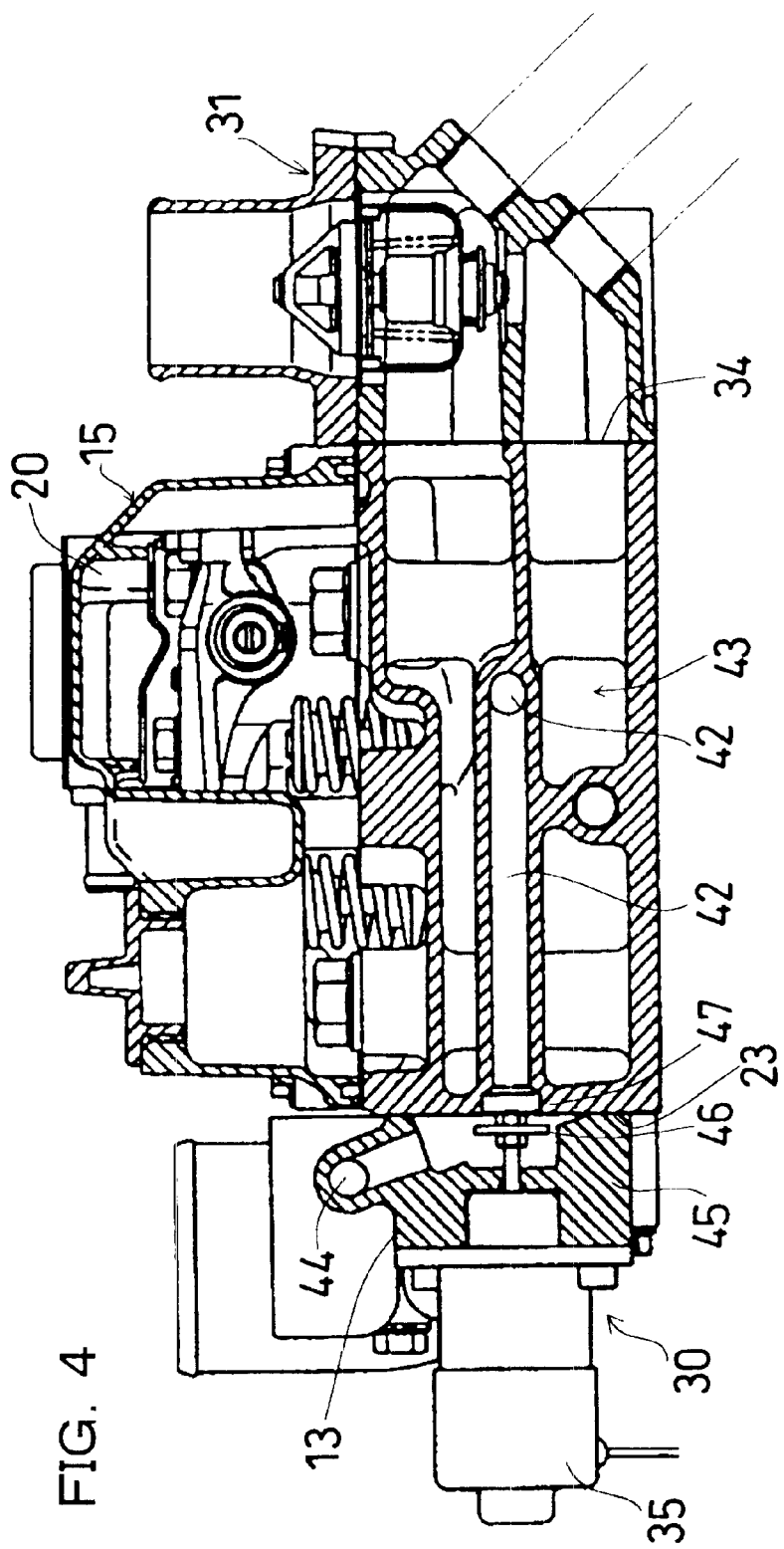
FIG. 4 is a sectional view of FIG. 2 taken along a line IV—IV.

As shown in FIG. 2, the fuel injection nozzle 2 is inserted into a nozzle boss 6a provided by projecting the intake port wall portion 6. This makes it hard for heat of exhaust air which passes through an exhaust port 11 to be transmitted to the fuel injection nozzle 2, with the result of being able to inhibit the overheat of the fuel injection nozzle 2.

A relationship of the glow plug 3 with a head jacket 43 is as follows.

As shown in FIG. 2, formed between the intake port 5 and the exhaust port 11 is an inter-port transverse water passage 12, to which the intake port wall portion 6 with the glow plug 3 extending therethrough is opposed. This can inhibit the overheat of the glow plug 3. Cooling water which passes through the inter-port transverse water passage 12 is arranged so that it flows from the intake air distributing means 13 to the exhaust air converging means 14. Thus the exhaust air heat is hardly transmitted to the intake air distributing means side with the result of being able to inhibit temperature increase of the intake air and therefore fill the intake air with a high efficiency.

A relationship of the glow plug 3 with the head cover 15 is as follows.

As shown in FIG. 1, the head cover 15 attached to the cylinder head 1 has an outer wall 16 through which an end portion of the glow plug 3 extends. Thus the glow plug 3 has a terminal 3a projecting out of the head cover 15. This removes a likelihood that condensed water, oil mist and the like within the head cover 15 adhere to the terminal with the result of being able to inhibit the leakage of the glow plug 3.

The head cover 15 includes a concaved, recessed portion or space 15a that is configured and arranged to accommodate and permit extension of the terminal 3a of the glow plug 3 therefrom.

A relationship of the glow plug 3 with a breather chamber 20 is as follows.

Figures 5A, 5B:
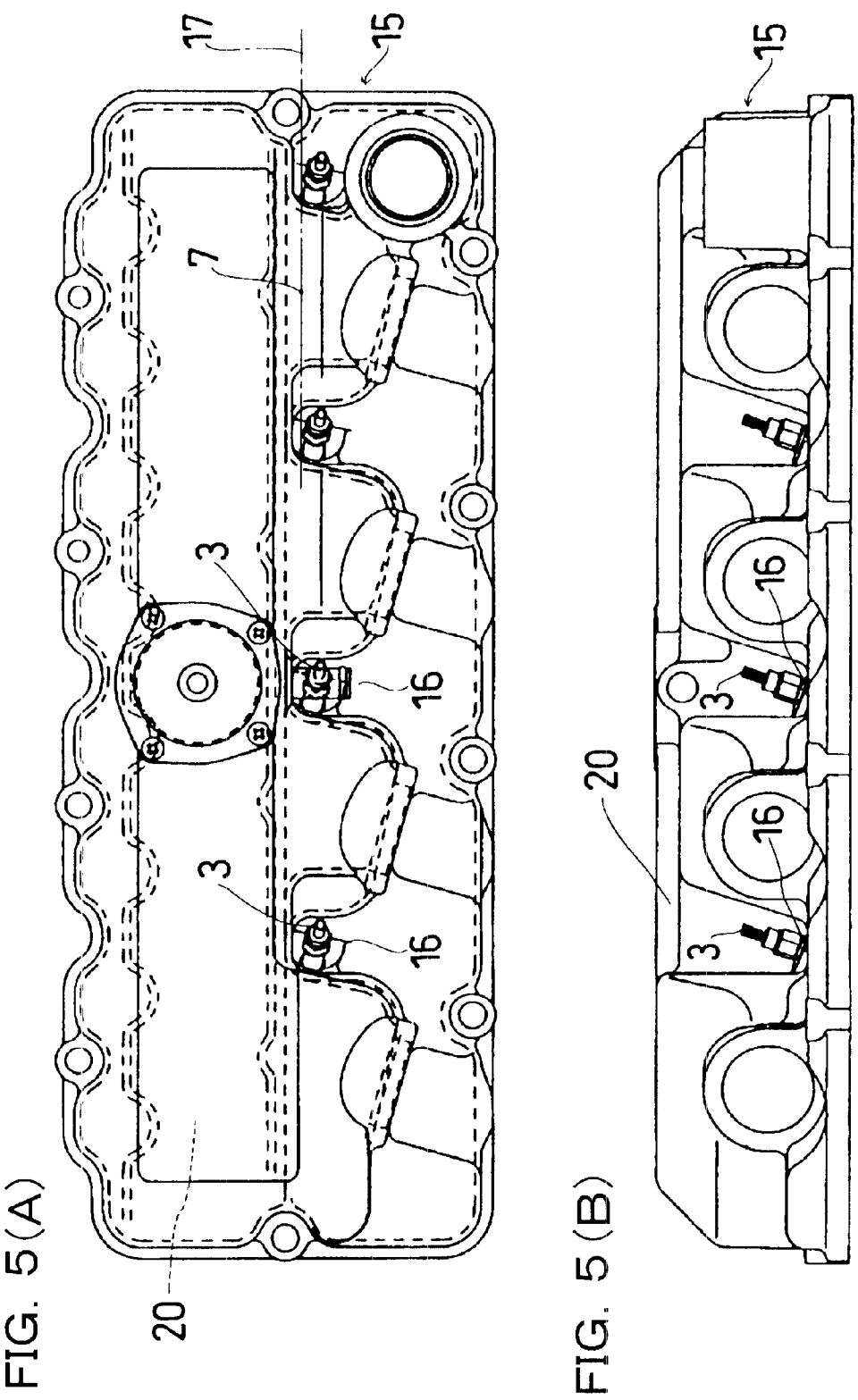
FIG. 5(A) is a plan view and FIG. 5(B) is a side view.
Figure 6:
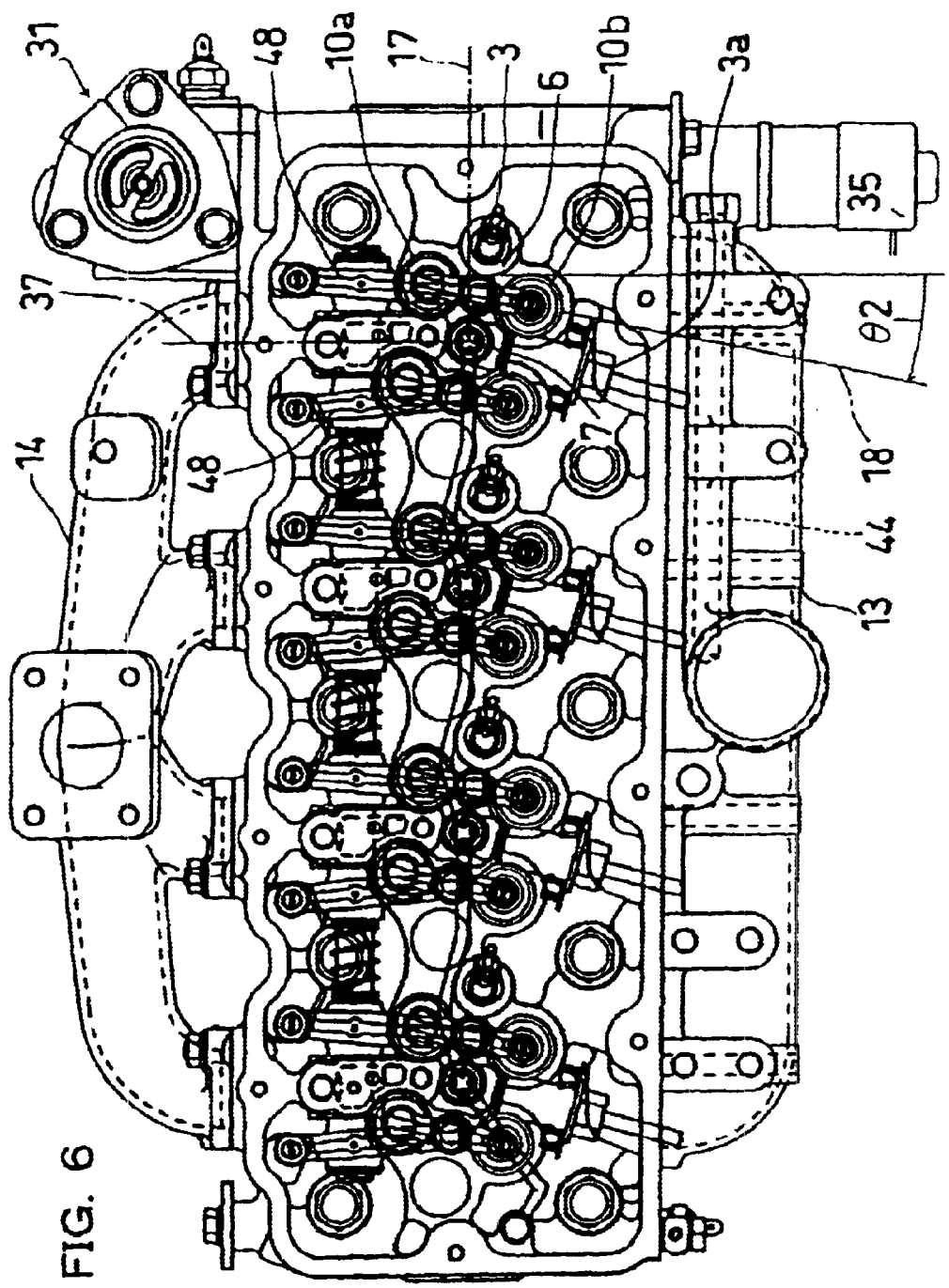
FIG. 6 is a plan view of the engine shown in FIG. 1, from which the head cover is removed.

As shown in FIG. 5, when seen in a direction parallel to the cylinder center axis 7, the breather chamber 20 to be provided in a ceiling of the head cover 15 is deviated toward one side of a center axis 17 of a crank shaft. As shown in FIG. 6, two intake valve ports 10a, 10b are provided for every intake port 5. In order to extend the glow plug 3 through the intake port wall portion 6 between the intake air valve ports 10a and 10b, the following arrangement is made.

As shown in FIG. 6, when seen in the direction parallel with the cylinder center axis 7, an imaginary connecting line 18 mutually connects center points of the two intake valve ports 10a and 10b. The glow plug 3 is displaced in a direction opposite to the deviated direction of the breather chamber 20 through rotating the imaginary connecting line 18 from a position where it perpendicularly crosses the center axis 17 of the crank shaft around the cylinder center axis 7 by a predetermined angle ($\theta 2$). Owing to this arrangement, it is possible to expand the breather chamber 20 in a direction opposite to its deviated direction without being interrupted by the glow plug 3 which extends through the head cover 15. This results in being able to secure a large volume of the breather chamber 20.

An intake device is constructed as follows.

As shown in FIG. 2, the cylinder head 1 has a side surface 23 on which the intake air distributing means 13 is arranged. The intake air distributing means 13 is formed into a structure of a longitudinal case which extends along the side surface 23 of the cylinder head 1. The intake air distributing means 13 has a side surface opposing to the side surface 23 of the cylinder head 1. The side surface is fully opened to provide an opening. The opening has an edge 24 attached to the side surface 23 of the cylinder head 1. Further, the cylinder head 1 has the side surface 23 provided with an attaching surface 25, to which the opening edge 24 of the intake air distributing means 13 is attached. The side surface 23 of the cylinder head 1 has a portion surrounded by the attaching surface 25. The portion is retreated from the attaching surface 25 toward an interior area of the cylinder head 1. This can secure a sufficient sectional area of an intake air passage even if the intake air distributing means 13 decreases in width, to result in the possibility of projecting the intake air distributing means 13 from the side surface 23 of the cylinder head 1 in a reduced length.

As shown in FIG. 2, an outwardly facing surface 27 is positioned between respective intake ports 26, 26 of adjacent cylinders. There exist between the outwardly facing surface 27 and inner peripheral surfaces 26a, 26a of the respective intake air port inlets 26, 26, boundary portions 26b, 26b, which are rounded at corners. This removes the likelihood of causing a turbulent flow at the boundary portions 26b, 26b when introducing intake air from the intake air distributing means 13 to the intake ports 5, 5 with the result of being able to take air into the respective intake ports 5, 5 smoothly. Besides, there does not occur such a disadvantage that the rounded corners are partly chipped to produce edges when polishing the attaching surface 25. This makes it assured to form smooth rounded corners. Additionally, it is possible to preliminarily round the corners before polishing the attaching surface 25. These round corners can be formed with a casting mold of the cylinder head 1. Therefore, it is easy to form the round corners.

Parts are attached to the cylinder head 1 by the following structure.

As shown in FIG. 2, the cylinder head 1 is provided with the intake air distributing means 13, the exhaust air converging means 14 and a thermostat case 31 for circulating cooling water. The intake port 5 and the exhaust port 11 are led out in mutually opposing directions along a width direction of the cylinder head 1 from the intake valve ports 10a, 10b and the exhaust valve ports 32a, 32b, respectively. The cylinder head 1 has the one side surface 23 attached to the intake air distributing means 13 and has the other side surface 34 attached to the exhaust air converging means 14.

As shown in FIG. 2, when arranging the thermostat case 31 on the side surface 34 of the cylinder head 1 with the exhaust air converging means 14 attached thereto, at one end portion in a longitudinal direction of the cylinder head 1, on the assumption that the head longitudinal direction is taken as a front and rear direction and a side on which there exits the one end portion of the cylinder head 1 where the thermostat case 31 is arranged is regarded as a front side, exhaust valve ports 32a, 32b of one cylinder are disposed rearwards of intake valve ports 10a, 10b of the one cylinder and the exhaust air converging means 14 is positioned backwards of the intake air distributing means 13. The thermostat case 31 is attached to the side surface 34 of the cylinder head 1 in front of the exhaust air converging means 14.

The foregoing construction offers the following advantage.

A large thermostat case 31 can be arranged on the side surface 34 of the cylinder head 1 to result in shortening the entire length of the engine. The exhaust converging means 14 is disposed rearwards to result in forming a large attaching surface on the side surface 34 of the cylinder head 1 in front thereof. A large thermostat case 31 can be attached to the large attaching surface. Thus it is possible to unwastedly utilize the side surface 34 of the cylinder head 1 as a surface for attaching parts.

As shown in FIG. 2, a valve actuator 35 of an EGR device is disposed on the side surface 23 of the cylinder head 1 ahead of the intake air distributing means 13. As such, while a large thermostat case 31 is arranged in a large space in front of the exhaust gas converging means 14, a small valve actuator 35 is disposed in a narrow space ahead of the intake air distributing means 13. In consequence, the cylinder head 1 can house parts well enough to be made compact.

A relationship of the exhaust port 11 with push rods 36 is as follows.

As shown in FIG. 2, when seen in the direction parallel with the cylinder center axis 7, a transverse line 37 is imagined to perpendicularly cross the center axis 17 of the crank shaft on the cylinder center axis 7. Intake valve ports 10a, 10b of one cylinder are arranged in front of the imaginary transverse line 37 and exhaust valve ports 32a, 32b of the one cylinder are disposed at the back of the imaginary transverse line 37. When positioning push rods 36, 36 of a valve operating device on a lead-out side of the exhaust port 11, the exhaust port 11 forwardly deflects a portion, which extends from a lead-out beginning portion 39 to a mid portion 38 along the head width direction, and forwardly deviates a lead-out terminal portion 40, which runs along the head width direction, to a position where it overlaps the imaginary transverse line 37. A pair of push rods 36, 36 of the one cylinder are arranged separately in front and at the back of the lead-out terminal portion 40, respectively.

The foregoing construction offers the following advantage.

As shown in FIG. 6, rocker arms 48, 48 can take a position in parallel or substantially parallel with the imaginary transverse line 37 so that they can be reduced in length. This results in decreasing the weight inertia of the rocker arms 48, 48 to enhance their working follow-up ability with respect to the push rods 36, 36, which leads to the possibility of precisely effecting the valve operation. Further, it is possible to arrange the pair of push rods 36, 36 and the lead-out terminal portion 40 of the exhaust port 11 without taking much labor. In consequence, there is no need of narrowing the lead-out terminal portion 40 of the exhaust port 11 so as to avoid the push rods 36, 36, which results in the possibility of decreasing the passage resistance of the exhaust port 11.

The exhaust port 11 is constructed as follows.

As shown in FIG. 2, a pair of exhaust valve ports 32a, 32b are arranged along the head width direction within the exhaust port 11. In order to provide a first exhaust valve port 32a by opening the lead-out beginning portion 39 of the exhaust port 11 and a second exhaust valve port 32b by opening the mid portion 38 of the exhaust port 11, the portion of the exhaust port 11 which extends from the lead-out beginning portion 39 to the mid portion 38 along the head width direction is curved while being forwardly led out. Then a curved arc of the mid portion 38 has a center position which is opened to provide the second exhaust valve port 32b. Formed rearwardly of the second exhaust valve port 32b is a passage 41 for bypassing exhaust air from the first exhaust valve port 32a. Accordingly, the exhaust air from the first exhaust valve port 32a does not prevent the flow-out of the exhaust air from the second exhaust valve port 32b to result in a high exhaust efficiency. Besides, the exhaust air from the first exhaust valve port 32a passes the bypass passage 41 positioned rearwards of the second exhaust valve port 32b to result in inhibiting the overheat of a peripheral edge portion of the second exhaust valve port 32b.

A relationship of an exhaust device with the EGR device is as follows.

As shown in FIG. 2, the exhaust air guided by the curved mid portion 38 of the exhaust port 11 blows against a portion from which an EGR gas lead-out passage 42 is led out. Therefore, it is possible to effect exhaust air recirculation by employing a push-in force of the exhaust air in addition to a differential pressure between intake air and exhaust air, with the result of being able to secure a sufficient amount of exhaust air recirculation. Further, the EGR gas lead-out passage 42 passes within the head jacket 43. This dispenses with an exclusive EGR gas radiator to result in facilitating the arrangement of the parts of the cylinder head 1. Additionally, an EGR gas supply passage 44 is connected to the EGR gas lead-out passage 42 in continuity therewith. The EGR gas supply passage 44 is formed within a wall of the intake air distributing means 13 and therefore does not largely project from the cylinder head 1, which results in facilitating the arrangement of the parts of the cylinder head 1.

The valve actuator 35 of the EGR device 30 is attached by the following construction.

As shown in FIG. 2, a flange portion 45 is led out forwards of the intake air distributing means 13. The valve actuator 35 of the EGR device 30 is attached to the flange portion 45. This case inhibits heat deterioration of the valve actuator 35 more than a case where the valve actuator 35 is attached directly to the cylinder head 1. The valve actuator 35 drives an EGR valve 46, a valve seat 47 of which is formed on the side surface 23 of the cylinder head 1 with the intake air distributing means 13 attached thereto. This makes it possible to do the maintenance of the valve seat 47 easily.

What is claimed is:

1. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and an intake port (5), and being inclined with respect to the fuel injection nozzle (2) by a predetermined angle (θ1) and having a leading end inserted into the cylinder mid portion (4), in order to use a swirl intake port for the intake port (5), the intake port wall portion (6) having an inner wall surface (8) near intake valve ports (10a), (10b), the inner wall surface (8) being inclined so that it approaches a cylinder center axis (7) as it comes closer to a cylinder (21) and running along the inclination of the glow plug (3), the inner wall surface (8) opposing to a wall surface (8a), which is made upright in a direction parallel with the cylinder center axis (7), the wall surfaces (8) and (8a) defining therebetween a wedge-like port portion (5a) which increases its width) toward the intake valve ports (10a), (10b).

2. A direct-injection type diesel engine as set forth in claim 1, wherein the intake port wall portion (6) is projected to provide a nozzle boss (6a), into which the fuel injection nozzle (12) is inserted.

3. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and an intake port (5), and being inclined with respect to the fuel injection nozzle (2) by a predetermined angel (θ1) and having a leading end inserted into the cylinder mid portion (4), the intake port (5) and an exhaust port (11) defining therebetween an inter-port transverse water passage (12), to which the intake port wall portion (6) with the glow plug (3) extending therethrough is opposed.

4. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and the intake port (5), and being inclined with respect to the fuel injection nozzle (2) by a predetermined angle (θ1) and having a leading end inserted into the cylinder mid portion (4), the intake port (5) and an exhaust port (11) defining therebetween an inter-port transverse water passage (12), to which the intake port wall portion (6) with the glow plug (3) extending therethrough is opposed, cooling water passing through the inter-port transverse water passage (12) and being arranged to flow from an intake air distributing means (13) to an exhaust air converging means (14).

5. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and the intake port (5), and being inclined with respect to the fuel injection nozzle (2) by a predetermined angle (θ1) and having a leading end inserted into the cylinder mid portion (4), the cylinder head (1) having a head cover (15) attached thereto, the head cover (15) having an outer wall (16) through which the glow plug (3) has an end portion extended, the glow plug (3) having a terminal projected out of the head cover (15), when seen in a direction parallel with a cylinder center axis (7), the head cover (15) having a ceiling provided with a breather chamber (20) which is deviated toward one side of a center axis (17) of a crank shaft, two valve ports (10a) and (10b) being provided for every intake port (5), in order to extend the glow plug (3) through the intake port wall portion (6) between the intake valve ports (10a) and (10b), when seen in a direction parallel with the cylinder center axis (7), the glow plug (3) being displaced in a direction opposite to the deviated direction of the breather chamber (20) by rotating an imaginary connecting line (18) which mutually connects respective center points of the two intake air valve ports (10a) and (10b), around the cylinder center axis (7) from a position where it perpendicularly crosses the center axis (17) of the crank shaft, by a predetermined angle (θ2).

6. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and the intake port (5), and being inclined with respect to the fuel injection nozzle (2) by a predetermined angle (θ1) and having a leading end inserted into the cylinder mid portion (4), the cylinder head (1) having a head cover (15) attached thereto, the head cover (15) having an outer wall (16) through which the glow plug (3) has an end portion extended, in order for the glow plug (3) to have a terminal projected out of the head cover (15), an outer wall (16) of the head cover (15) having a portion which extends through an end portion of the glow plug (3), the portion being retreated toward the cylinder head (1), the glow plug (3) having a terminal (3a) arranged along with the retreat of the outer wall (16) within a space (15a) of a concaved portion which is formed in the head cover (15).

7. The direct-injection type diesel engine as set forth in claim 6, wherein in order to attach the glow plug (3) to the cylinder head (1) of a multi-cylinder engine, on the assumption that a longitidinal direction of the cylinder head (1) is taken as a front and rear direction and a width direction thereof is regarded as a left and right direction, the intake port (5) is formed along the left and right direction, and on the other hand, the glow plug (3) is inclined in the front and rear direction and has a terminal (3a) positioned at a mid portion in the left and right direction of the cylinder head (1) when seen in parallel with a cylinder center axis (7).

8. A direct-injection type diesel engine comprising a cylinder head (1) with a fuel injection nozzle (2) and a glow plug (3) attached thereto, the fuel injection nozzle (2) having a leading end opposed to a cylinder mid portion (4), the glow plug (3) extending through an intake port wall portion (6) between the fuel injection nozzle (2) and the intake port (5), and being inclined with respect to the fuel injection nozzle (2) by a predetermined angle ($\theta 1$) and having a leading end inserted into the cylinder mid portion (4), wherein in order to attach the glow plug (3) to the cylinder head (1) of a multi-cylinder engine, on the assumption that a longitudinal direction of the cylinder head (1) is taken as a front and rear direction and a width direction thereof is regarded as a left and right direction, the intake port (5) is formed along the left and right direction, and on the other hand, the glow plug (3) is inclined in the front and rear direction and has a terminal (3a) positioned at a mid portion in the left and right direction of the cylinder head (1) when seen in parallel with a cylinder center axis (7).

* * * * *